(12) United States Patent
Wolterman

(10) Patent No.: US 7,918,637 B2
(45) Date of Patent: Apr. 5, 2011

(54) ASSIST DEVICE FOR A TIRE AND WHEEL ASSEMBLY

(75) Inventor: Michael John Wolterman, Brighton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 746 days.

(21) Appl. No.: 11/753,639

(22) Filed: May 25, 2007

(65) Prior Publication Data

US 2008/0292434 A1  Nov. 27, 2008

(51) Int. Cl.
*B60B 29/00* (2006.01)

(52) U.S. Cl. ......... 414/426; 414/463; 414/810; 414/425

(58) Field of Classification Search .................. 414/426, 414/463, 810, 425
See application file for complete search history.

(56) References Cited

U.S. PATENT DOCUMENTS

| | | | |
|---|---|---|---|
| 1,964,119 A | 7/1933 | Hendry | |
| 2,569,050 A | 9/1951 | Gref et al. | |
| 3,126,111 A | 3/1964 | Lewis | |
| 3,378,154 A | 4/1968 | Mousel | |
| 5,007,789 A * | 4/1991 | Painter | 414/427 |
| 5,165,838 A * | 11/1992 | Kallansrude et al. | 414/471 |
| 5,176,487 A * | 1/1993 | Flitton | 414/428 |
| 5,181,821 A * | 1/1993 | King, Sr. | 414/427 |
| 5,709,520 A | 1/1998 | Pish | |
| 6,382,644 B1 | 5/2002 | Rawlings | |
| 6,390,759 B1 | 5/2002 | Novak et al. | |
| 6,863,488 B2 | 3/2005 | Chopra | |
| 2002/0150453 A1* | 10/2002 | Hedley et al. | 414/426 |
| 2004/0156700 A1 | 8/2004 | Chopra | |

FOREIGN PATENT DOCUMENTS

EP 466438 A1 * 1/1992

* cited by examiner

*Primary Examiner* — Saúl J Rodríguez
*Assistant Examiner* — Willie Berry
(74) *Attorney, Agent, or Firm* — Dinsmore & Shohl LLP

(57) ABSTRACT

An embodiment of an assist device for maneuvering a tire and wheel assembly is provided. The device comprises a base member, a support frame configured to support a tire and wheel assembly thereon, and a sliding mechanism disposed between the base member and support frame, wherein the sliding mechanism is configured to move the support frame sideways, forward, and backward relative to the base member.

20 Claims, 3 Drawing Sheets

ASSIST DEVICE FOR A TIRE AND WHEEL ASSEMBLY

TECHNICAL FIELD

Embodiments of the present invention generally relate to devices for maneuvering tire and wheel assemblies into position on vehicle, and specifically relate to devices configured to assist a person maneuvering a tire and wheel assembly into position on a larger vehicle such as a minivan or sport utility vehicle (SUV).

BACKGROUND

Removing tire and wheel assemblies from vehicles and replacing such assemblies is a difficult and laborious task, particularly when positioning the tire and wheel assembly correctly for mounting onto the wheel studs of the vehicle. Changing a tire and wheel assembly for a larger vehicle is especially difficult, because larger vehicles tend to have larger and heavier tire and wheel assemblies. For larger tire and wheel assemblies, e.g., tire and wheel assemblies weighing 80 pounds or more, changing a tire and wheel assembly may be quite strenuous. Accordingly, there is a need for devices that can assist a person in maneuvering a tire and wheel assembly.

SUMMARY

According to one embodiment, an assist device for maneuvering a tire and wheel assembly is provided. The device may comprise a base member, a support frame configured to support a tire and wheel assembly thereon, and a sliding mechanism disposed between the base member and support frame, wherein the sliding mechanism is configured to move the support frame sideways, forward, and backward relative to the base member.

Another embodiment of an assist device for maneuvering a tire and wheel assembly is provided. The device may comprise a base member, a support frame configured to support a tire and wheel assembly thereon, and a jacking mechanism configured to raise and lower the support frame, wherein the jacking mechanism is operable to be stored in the base member. The devices also comprises a sliding mechanism disposed between the base member and support frame, wherein the sliding mechanism is configured to move the support frame sideways, forward, and backward relative to the base member.

These and additional objects and advantages provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the drawings enclosed herewith. The drawing sheets include.

Figure 1:
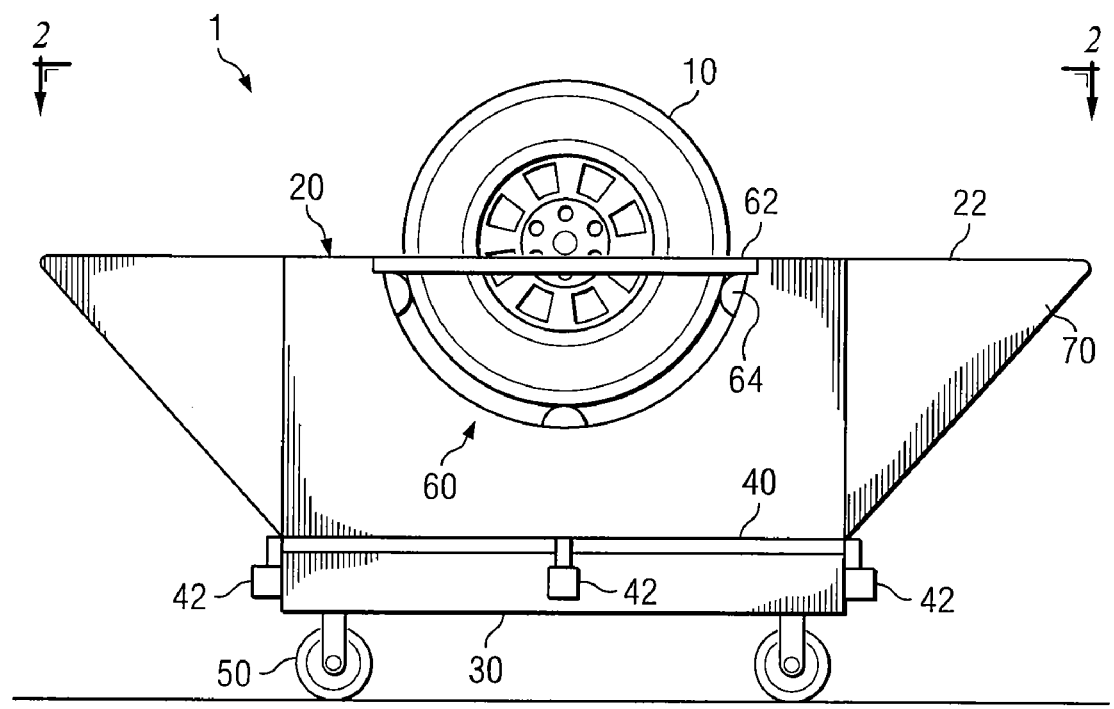
FIG. 1 is a front view of an assist device for a tire and wheel assembly, according to one or more embodiments of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION

Referring to the embodiment of FIG. 1, a device 1 for assisting a person in maneuvering a tire and wheel assembly 10 is shown. As defined herein, "the tire and wheel assembly" 10 refers to the inner circular hub, which is mounted on the wheel studs of the vehicle frame, and the outer tire material, for example, the rubber or composite material, concentrically surrounding the inner circular hub. As illustrated in FIG. 1, the device 1 may comprise a base member 30, a support frame for the tire and wheel assembly 20, and a sliding mechanism 40 therebetween.

Figure 6:
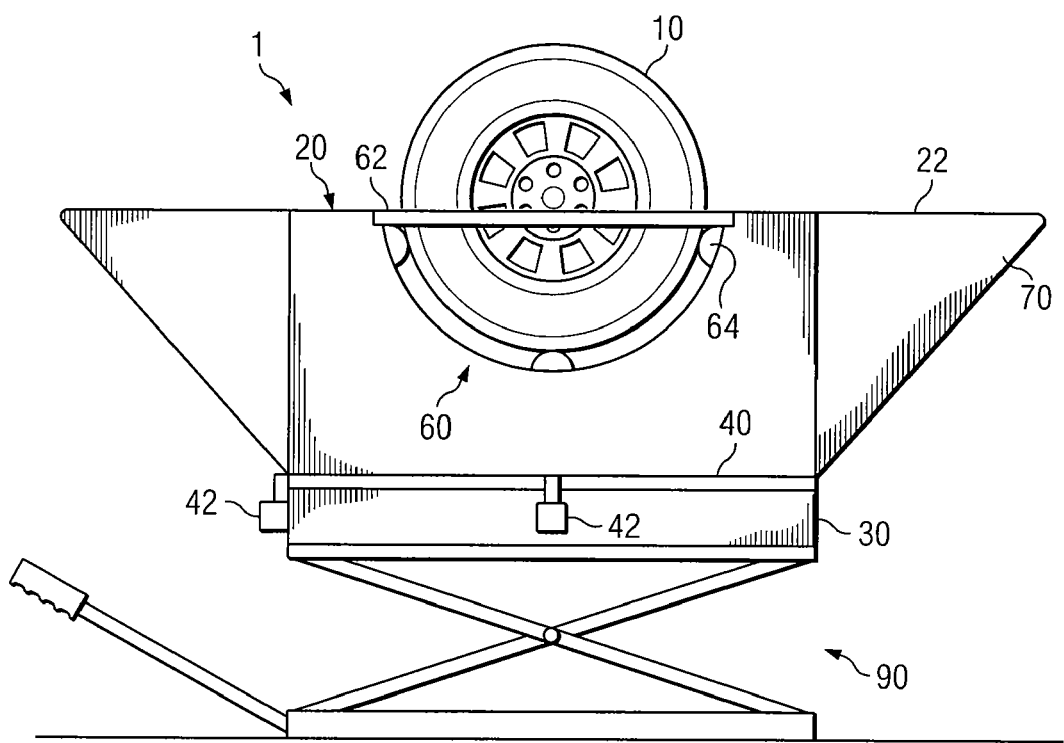
FIG. 6 is a front view of an assist device, wherein the device is raised via a jacking mechanism according to one or more embodiments of the present invention.

Referring to FIG. 1, the base member 30 is illustrated as having a rectangular shape, and is located at the lower portion of the device 1. In one embodiment, the base member 30 may comprise a storage compartment (not shown) operable to store various items. These items may include tools for changing a tire, such as a lug wrench. In an exemplary embodiment, the storage compartment may store a jacking mechanism 90 as shown in FIG. 6 (discussed later herein). The base member 30 may comprise various materials, for example, a rigid polymeric or metal based material.

The base member 30 may, in some embodiments, comprise a plurality of wheels 50 attached to and configured to move the device 1. The wheels 50 enable a user to easily transport the device 1 to various locations around the vehicle. In a further embodiment, the wheel 50 may be removable from the device 1. For example, the wheels 50 may include an external threaded portion used to engage an internal threaded portion of the base member 30, thereby facilitating easy coupling and decoupling of the wheels 50 to the base member 30. Removing the wheels 50 may stabilize the device 1 by preventing the device 1 from rolling along an uneven surface. e.g., in the tire jacking example of FIG. 6.

The device 1 may also comprise a support frame 20 configured to support the tire and wheel assembly 10. As shown in the figures, the support frame 20 is depicted as a housing above the base member 30; however, multiple support frame 20 structures and shapes are contemplated herein. In one embodiment, the support frame 20 comprises a semicircular cavity 60 disposed in an upper portion of the support frame 20. The semicircular cavity 60 is dimensioned to act as a cradle to support a tire and wheel assembly 10 thereon. As tire and wheel assemblies 10 have varying diameters and sizes, the semicircular cavities 60 may have varying diameters to accommodate and support these tire and wheel assemblies 10.

In a further embodiment as shown in FIG. 1, cavity 60 of the support frame 20 may comprise at least one roller 64 disposed along the semicircular cavity 60. By including one or more rollers 64 along the surface of the semicircular cavity 60, the tire and wheel assembly 10 may be rotated. This rotation may be beneficial when aligning the tire and wheel assembly 10 with wheel studs of a vehicle frame, and may be further beneficial when rolling the tire and wheel assembly 10 out of the support frame 20. The rollers 64 may comprise various structures as well as various materials suitable to minimize friction between the tire and wheel assembly 10 and the rollers 64. For example, the roller 64 may comprises a dowel type roller with a center hold oriented lengthwise. The roller 64 may material comprises durable material, for example, hard plastic, steel, aluminum, etc.

Figure 2:
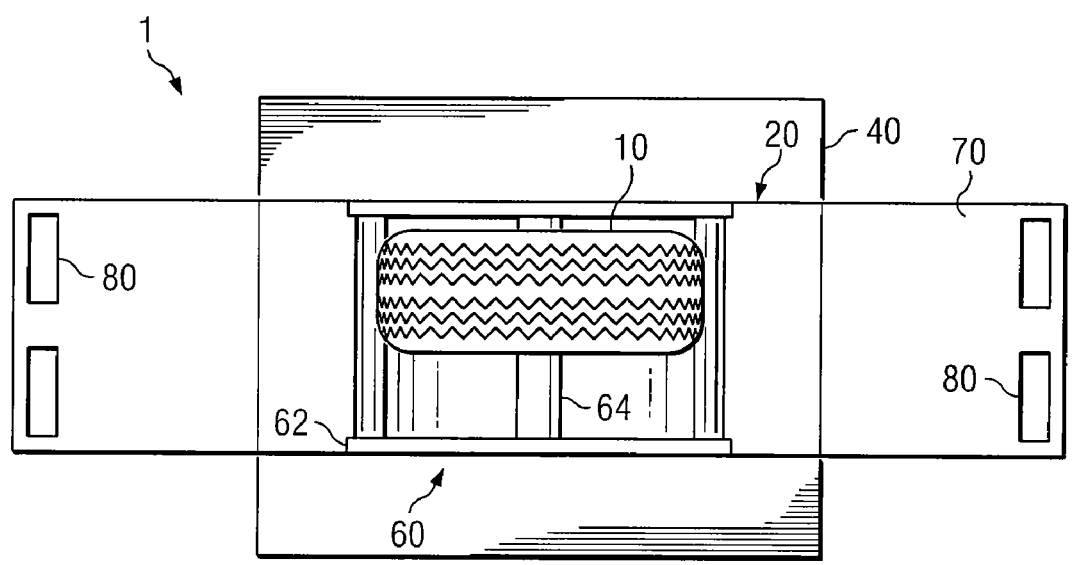
FIG. 2 is a top view of an assist device for a tire and wheel assembly according to one or more embodiments of the present invention.

To ensure the stability of the tire and wheel assembly 10 on the support frame 20, support frame 20 may further comprise a horizontal stabilizing bar 62 configured to stabilize a tire and wheel assembly 10 on the support frame 20. Referring to the embodiment FIG. 1, the horizontal stabilizing bar 62 may extend between opposite upper edges of the semicircular cavity 60. Referring to the embodiments of FIGS. 2-4, two horizontal stabilizing bars 62 may be disposed on parallel sides of the semicircular cavity 60. In one exemplary embodiment, the horizontal stabilizing bar 62 may pivot upwardly or downwardly on an axis point located on at least one of the upper edges of the semicircular cavity 60. In another exemplary embodiment, it is contemplated that the horizontal stabilizing bar 62 may be removable from the support frame 20. The horizontal stabilizing bar 62 may comprise various materials, for example and not by way of limitation, a metal rod.

Figure 5:
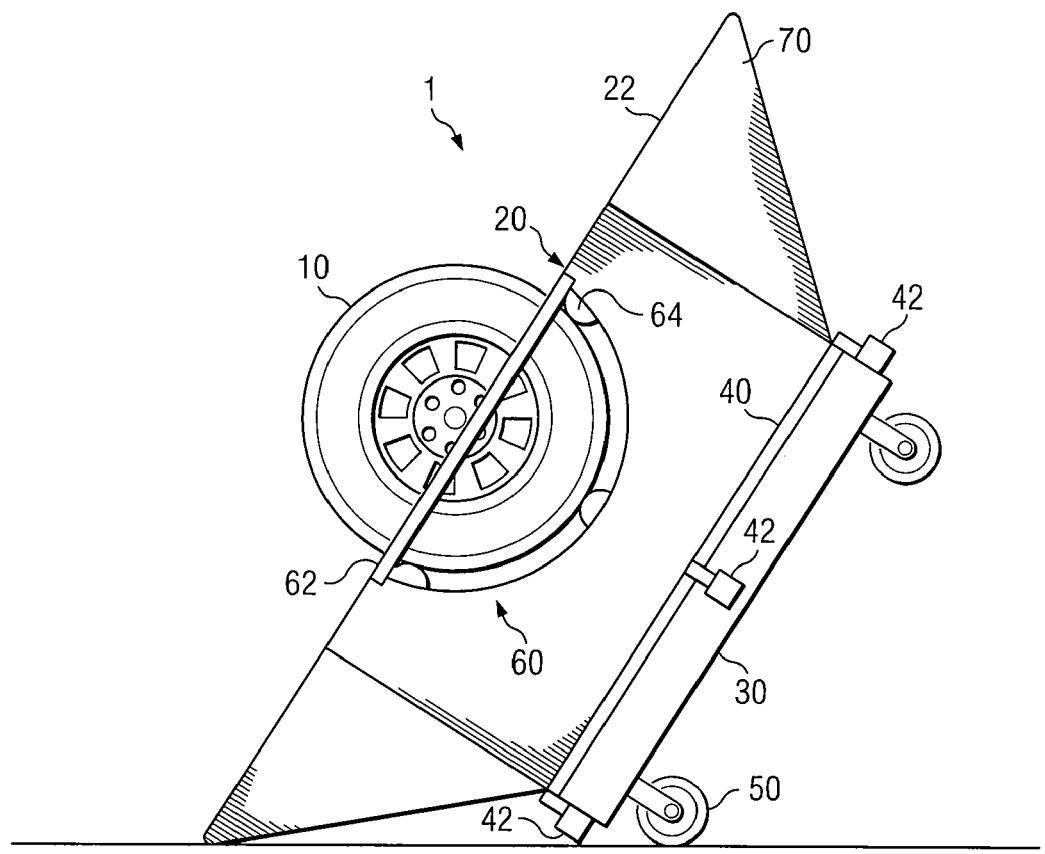
FIG. 5 is a front view of an assist device for a tire and wheel assembly in a tilted position according to one or more embodiments of the present invention.

Referring to FIG. 1, the support frame 20 may also comprise at least one inwardly tapering side 70. As shown in the embodiment of FIG. 5, the support frame 20 comprises inwardly tapering sides 70, which allow for easy tilting of the device 1. When tilted, an outer edge of the inwardly tapered portion 70 of the support frame 20 contacts the ground or road surface. When the device 1 is tilted, the tire and wheel assembly 10 may easily roll out of the semicircular cavity 60, and then downward along the upper surface of the inwardly tapered portion 70 towards the ground. The device 1 has a well proportioned center of gravity, which enables the device 1 to be stable while in a tilted position.

Figure 3:
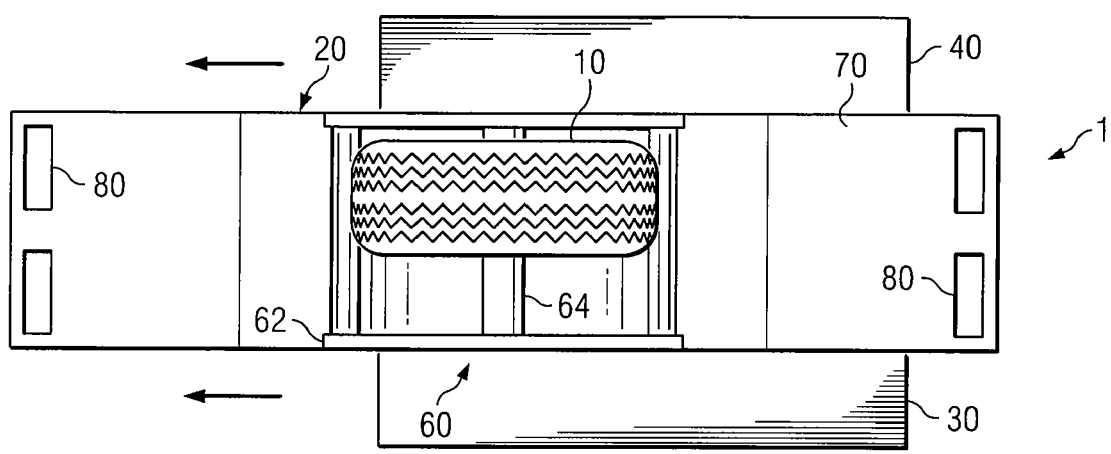
FIG. 3 is a top view of an assist device having a sliding mechanism, which moves a support frame of the assist device sideways according to one or more embodiments of the present invention.
Figure 4:
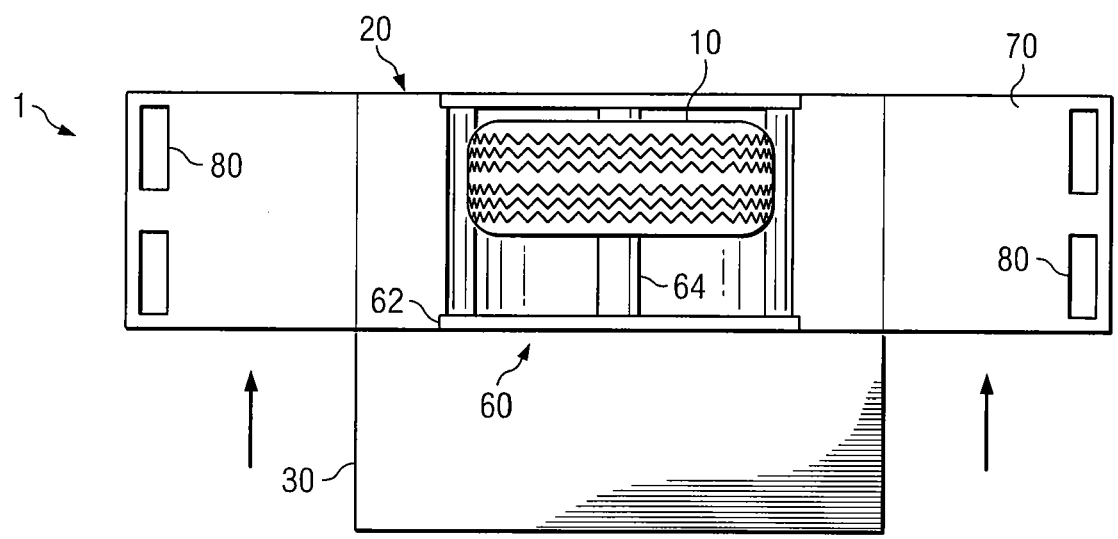
FIG. 4 is a top view of an assist device having a sliding mechanism, which moves a support frame of the assist device forwards or backwards according to one or more embodiments of the present invention.

As shown in FIGS. 3 and 4, the device 1 may also comprise a sliding mechanism 40 disposed between the base member 30 and support frame 20, and configured to move the support frame 20 relative to the base member 30. Referring to the embodiment of FIG. 3, the sliding mechanism 40 is configured to move the support frame 20 sideways. Further as shown in FIG. 4, the sliding mechanism 40 is also configured to the move the support frame 20 forward, and backward. Other movement directions, for example, diagonal movement are contemplated herein. The sliding mechanism 40 may comprise various components suitable for moving the support frame 20, for example, tracks, bearing surfaces, low friction sliding surfaces etc. In operation, the sliding mechanism 40 provides the device 1 with additional flexibility when aligning the tire and wheel assembly 10 with the wheel studs of the vehicle frame.

In a further embodiment, the sliding mechanism 40 may comprise at least one locking component 42. When engaged, the locking component 42 is configured to prevent the sliding mechanism 40 from moving. As shown in FIG. 1, multiple locking components 42 may be arranged at multiple locations adjacent the sliding mechanism 40 to block movement of the sliding mechanism 40 in multiple directions, i.e. sideways, forward, and backward. It is contemplated that each individual locking component may block movement in one of multiple directions. The locking component 42 may also comprise various devices known to one or ordinary skill in the art. For example and not by way of limitation, the locking component 42 may be a locking pin, a cotter pin, etc. In one embodiment, the locking component 42 is a pin that would secure the base member 30 and the sliding mechanism 40 together and hold the parts relative to each other. In another embodiment, the locking mechanism is a more elaborate mechanism that would lower the base member 30 onto the sliding mechanism 40, and the friction between these two parts would form the locking mechanism.

Referring to FIG. 6, the device may also comprise a jacking mechanism 90 configured to raise or lower the device 1. The jacking mechanism 90 may comprise a scissors jack, or another jacking apparatus known to one of ordinary skill in the art. The jacking mechanism 90 may be manual, hydraulic, or electrical. As stated above, the jacking mechanism 90 may be stored inside a storage compartment of the base member 30.

To aid the user in moving the device, the device 1 may comprise one or more handles 80 as shown in FIGS. 3 and 4. The handles 80 may be disposed at various locations within the device 1. Referring to an embodiment as shown in FIGS. 3 and 4, the handles 80 may comprise gripping portions on the support frame 20. Other handle types are contemplated herein.

The device 1 may be stored on the vehicle similar to how a vehicle jacking mechanism is stowed. It is contemplated that the vehicle may comprise a harness, securing, or locking component to engage and stabilize the device 1.

In operation, e.g. in the event of a flat tire, the jacking mechanism 90 may be removed from the device 1 in order to raise the vehicle. As would be familiar to one of ordinary skill in the art, the lug nuts of the tire may be loosened from the corresponding wheel studs of the vehicle frame prior to or after the vehicle is in a raised position. After the vehicle is raised, the device 1 may be removed from the vehicle and positioned under the flat tire and wheel assembly. For added flexibility, the device 1 may utilize its wheels 50 to roll into position of the flat tire and wheel assembly. The sliding mechanism 40 may also aid the user in aligning the device 1 with the flat tire and wheel assembly. Once aligned under the flat tire and wheel assembly, the loosened flat tire and wheel assembly may be placed onto the support frame 20 of the device 1. At which point, the device 1 may then be moved away from the vehicle 1. To remove the flat tire, the device 1 may be tilted such that an edge of the inwardly tapering portion 70 may contact the ground. Upon tilting the device, the flat tire and wheel assembly may be removed by rolling the flat tire and wheel assembly out of the support frame 20.

The opposite procedure can be used to install a spare tire and wheel assembly to a vehicle. The spare tire and wheel assembly is rolled onto the support frame of the device 1 while the device 1 is at a tilted position. Then, the device 1 is moved so that the spare tire and wheel assembly can be aligned with the wheel studs of the vehicle. The sliding mechanism 40 aids in aligning the spare tire and wheel assembly thereon with the wheel studs. The rollers 64 of the semicircular cavity 60 of the support frame 20 facilitate easy alignment of the lugs with the wheel studs.

It is noted that terms like "specifically," "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An assist device for maneuvering a tire and wheel assembly comprising:
   a base member;
   a support frame comprising at least one inwardly tapering side, wherein the support frame is configured to support a tire and wheel assembly thereon; and
   a sliding mechanism disposed between the base member and support frame, wherein the sliding mechanism is configured to move the support frame horizontally in at least two axial directions sideways, forward, and backward relative to the base member and the at least one inwardly tapering side contacts a ground surface to stabilize the support frame in a tilted position such that the tire and wheel assembly rolls out of the support frame downward along an upper surface of the inwardly tapered side toward the ground surface.

2. The assist device according to claim 1, wherein the sliding mechanism comprises at least one locking component configured to prevent the sliding mechanism from moving.

3. The assist device according to claim 1, further comprising a jacking mechanism configured to raise and lower the support frame.

4. The assist device according to claim 3, wherein the jacking mechanism comprises a scissors jack.

5. The assist device of claim 3, wherein the jacking mechanism is operable to be stored in the base member.

6. The assist device according to claim 1, wherein the support frame comprises a semicircular cavity disposed in an upper portion of the support frame, the semicircular cavity being configured to support a tire and wheel assembly.

7. The assist device according to claim 6, further comprising at least one roller disposed along the semicircular cavity, wherein the rollers are configured to facilitate rotation of a tire and wheel assembly disposed thereon.

8. The assist device according to claim 6, further comprising at least one horizontal stabilizing bar that extends between a first upper edge and a second upper edge of the semicircular cavity and is configured to stabilize a tire and wheel assembly on the support frame.

9. The assist device according to claim 8, wherein the at least one horizontal stabilizing bar is pivotable or removable.

10. The assist device according to claim 1, further comprising a plurality of wheels attached to the base member and configured to move the device.

11. The assist device according to claim 1, further comprising at least one handle to allow a user to move the device.

12. The assist device according to claim 11, wherein the at least one handle comprises gripping portions on the support frame.

13. An assist device for maneuvering a tire and wheel assembly, comprising:
   a base member;
   a support frame comprising at least one inwardly tapering side, wherein the support frame is configured to support a tire and wheel assembly thereon;
   a sliding mechanism disposed between the base member and the support frame, wherein the sliding mechanism is configured to move the support frame horizontally in at least two axial directions, independently of one another, sideways, forward, and backward relative to the base member,
   wherein the assist device operates in a horizontal orientation when the base member is generally parallel with a ground surface, and the assist device having a tilted orientation when the at least one inwardly tapering side of the support frame contacts the ground surface, thereby stabilizing the assist device in the tilted orientation such that the tire and wheel assembly rolls out of the support frame downward along an upper surface of the inwardly tapering side toward the ground surface.

14. The assist device of claim 13, wherein the support frame further comprises a semicircular cavity disposed in an upper portion of the support frame, the semicircular cavity supports the tire and wheel assembly when the assist device operates in the horizontal orientation, and the tire and wheel assembly may be rolled out of the semicircular cavity when the assist device operates in the tilted orientation.

15. The assist device of claim 13, wherein sliding mechanism is configured to move the support frame while the assist device operates in the horizontal orientation.

16. The assist device of claim 13, wherein the sliding mechanism further comprises at least one locking component that prevents the support frame from moving horizontally relative to the base member.

17. The assist device of claim 13, further comprising a jacking mechanism that raises and lowers the support frame vertically relative to the base member.

18. A method of maneuvering a tire and wheel assembly, comprising:
   positioning an assist device proximate to a tire and wheel assembly attached to a vehicle, the assist device comprising:
      a base member;
      a support frame comprising at least one inwardly tapering side; and
      a sliding mechanism disposed between the base member and the support frame, wherein the sliding mechanism is configured to move the support frame horizontally in at least two axial directions, independent of one another, sideways, forward, and backward relative to the base member;
   positioning the tire and wheel assembly inside the support frame of the assist device;
   detaching the tire and wheel assembly from the vehicle such that the tire and wheel assembly is supported by the support frame of the assist device;
   tilting the assist device such that the at least one inwardly tapering side of the support frame contacts a ground surface; and
   rolling the tire and wheel assembly out of the support frame.

19. The method of claim 18, further comprising moving the support frame horizontally relative to the base member.

20. The method of claim 18, further comprising jacking the support frame vertically relative to the base member.

* * * * *